April 5, 1966 J. H. ROBB 3,245,051

INFORMATION STORAGE MATRICES

Filed Nov. 16, 1960 2 Sheets-Sheet 1

INVENTOR
JOHN H. ROBB

BY Thomas & Crickenberger

ATTORNEYS

INFORMATION STORAGE MATRICES

Filed Nov. 16, 1960

3,245,051
Patented Apr. 5, 1966

3,245,051

INFORMATION STORAGE MATRICES

John H. Robb, 2001 16th St. NW., Washington, D.C.

Filed Nov. 16, 1960, Ser. No. 69,633
8 Claims. (Cl. 340—173)

This invention relates to information storage matrices for making permanent records of digital information.

The storage of digital information for computer applications is generally accomplished in one of two classes of mediums. The storage may be permanent, that is, not subject to erasure or modification, or the storage may be temporary and readily changeable. Some form of paper such as cardboard or tape is widely used as a means of permanent storage. In the form of cards or tape the paper is punched and coded with the information, and once the information is stored, that is, after the holes have been punched, it is not easily subject to modification. The use of paper products such as cards and tape has the obvious advantage of low cost, but while the information storage is permanent the medium itself is easily damaged through wear and improper handling. Furthermore, the punched card and tape systems are electromechanical in naturre, that is, they depend upon electromechanical equipment to move the storage media relative to the recording (writing) and sensing (reading) devices in order to give an electrical indication of the coded information present. Such systems are inherently slow in operation, compared to all-electrical, non-moving systems.

Magnetic devices such as tapes, drums, discs and cores are widely used as forms of temporary information storage devices. The magnetic tape and drum and disc are also electromechanical devices and consequently their speed of operation is limited. Magnetic cores are completely electrical in operation. However, these devices are used almost exclusively for temporary storage media because of the high cost and complexity of construction. The operation of magnetic cores is very fast and it would be highly desirable to have a permanent storage medium which combines the speed of magnetic core operation with the simplicity and inexpensiveness of the punched card. The storage matrices of the present invention provide a medium for the storage of digital information which combines the speed of magnetic cores with the economy of punched cards and which is not subject to deterioration through handling and misuse. The structure lends itself readily to mass production techniques.

In a preferred arrangement of the invention the matrices accomplish the function of storage by means of a pattern of electrical interconnections. The matrices are constructed from layers of insulation having conductive patterns established thereon by well known deposition or printed circuit techniques. The layers are assembled in a composite laminated structure having two sets of conductive lines forming a matrix. One set of lines has a coating of a rectifying barrier layer disposed thereon. In one form of the invention the second set of lines has a layer of solder disposed thereon and is separated from the first set of lines having the rectifying material thereon by a sheet or film of insulating material. When a sufficient voltage is applied to orthogonal lines, the interposed insulating material breaks down at the junction point across which the potential appears and the solder melts and flows through to establish a contact between the lines which is unidirectional by virtue of the interposed rectifying material. In a second form of the invention the conductive lines of the second layer are disposed in contact with the rectifying layer of the first set of lines. When a predetermined potential is applied to orthogonal lines, the conductive material at the point of contact between the lines is vaporized or melts away and the conductive link is opened. By either of these arrangements a predetermined pattern of conductive links may be established in accordance with the code desired.

These and other features of the invention will be understood readily from the accompanying drawings in which.

Figure 1:
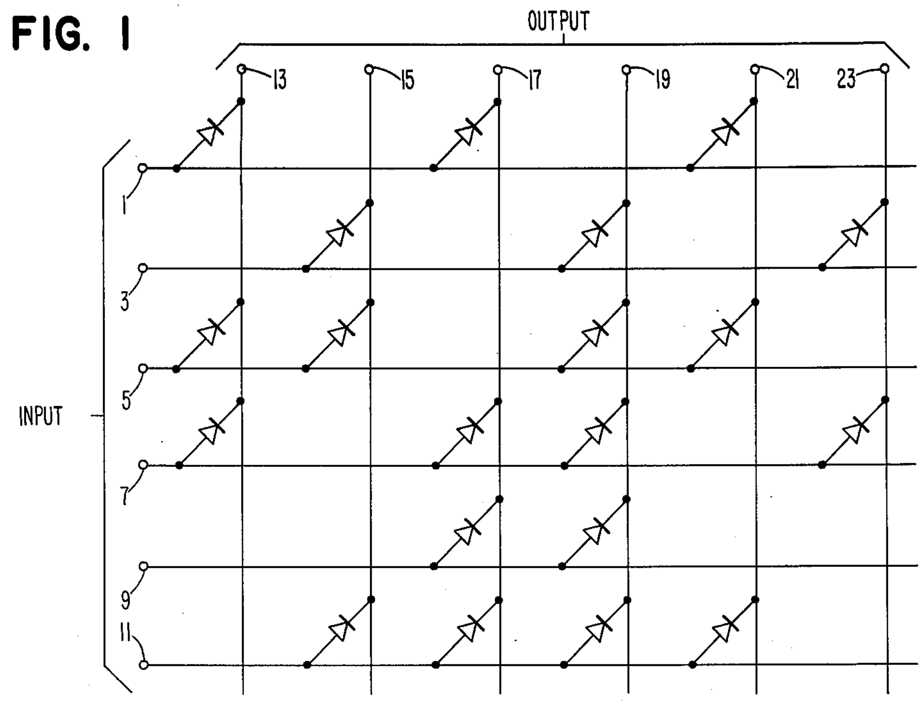
FIG. 1 is a diagrammatic illustration of a diode matrix.

Referring now to the drawings, FIG. 1 is an illustration of a diode matrix which may serve as a storage device. In this configuration input signals selectively applied to terminals 1, 3, 5, 7, 9 and 11 will produce outputs at terminals 13, 15, 17, 19, 21 and 23. The array shown is a six-by-six array although it will be appreciated that any number of lines may be employed.

As an example of the use of this array, it will be seen than an input at terminal 1 of the matrix will produce outputs at terminals 13, 17 and 21, while no outputs will appear at terminals 15, 19 and 23. It will be appreciated that the six outputs taken together will represent the binary number 101010. Whenever an input is applied to terminal 1 the output terminals will produce this same binary number; therefore, it might be said that the information represented by this binary number is stored in the matrix and may be read out whenever an input is applied to terminal 1. Similarly, each of terminals 3, 5, 7, 9 and 11 will produce a binary output number in accordance with the diodes arranged between the orthogonal sets of lines.

Matrices such as shown in FIG. 1 are cumbersome to construct because it is necessary to insert and connect by mechanical operations a diode at each junction at which a connection is desired. It will be appreciated that the construction of such a matrix would involve high assembly costs in addition to the cost of the components themselves. It is highly desirable therefore to be able to construct such a matrix both economically and reliably. This is accomplished in accordance with the present invention.

Figure 2:
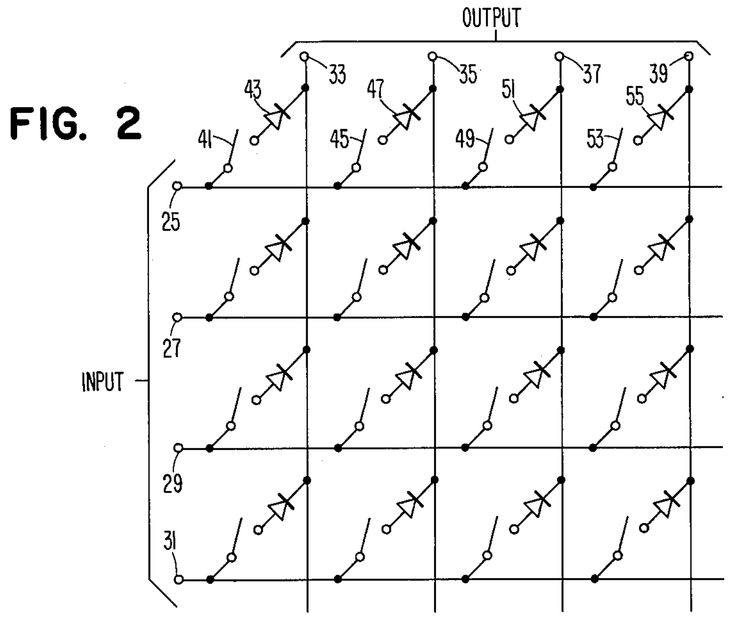
FIG. 2 is a diagrammatic illustration of a diode matrix in which any pattern of coded information may be stored.

FIG. 2 illustrates a diode matrix in which orthogonal sets of lines 25, 27, 29 and 31 and 33, 35, 37 and 39 are arranged in matrix form. Every line in each set of lines is connected to all of the lines of the other set through a switch and a diode arranged in series relationship at each intersection of lines. For example, the line 25 is connected to line 33 through switch 41 and diode 43; the line 25 is connected to the line 35 through switch 45 and the diode 47; the line 25 is connected to the line 37 through switch 49 and diode 51; and the line 25 is connected to the line 39 through switch 53 and diode 55.

The matrix shown in FIG. 2 is illustrative of a matrix which may be used to represent any desired code pattern within the limits of the four-by-four array shown. Before establishing a code in such a matrix, the switches are either all open or all closed. The switches of FIG. 2 are all open, and it is not believed necessary to illustrate the all closed position since this will be obvious. Beginning with line 25, if it is desired to establish an output pattern on lines 33, 35, 37 and 39 of 1010, it then is necessary only to close switches 41 and 49. Thus, when a signal is applied to line 25 an output signal is obtained on lines 33 and 37.

If the initial state of the matrix were such that all of the switches were in the closed position, then in order to produce an output of 1010 for an input signal on line 25, it would then be necessary to open switches 45 and 53. It will be seen, therefore, that beginning with the switches of the matrix either all closed or all open, storing any desired code into the matrix is a relatively simple matter.

Matrices of the general form such as shown in FIG. 1 are well known in the art and there are many well known techniques for constructing such matrices. The technique discussed in connection with the matrix of FIG. 2 furnishes a versatile matrix which may be repeatedly utilized to store different information. However, if conventional circuit elements are used for the switches and diodes shown, the resultant product would be most bulky and cumbersome, as well as economically infeasible. It is a feature of this invention to construct matrices having an equivalent circuit of the all-open switch embodiment shown in FIG. 2 as well as the all-closed switch embodiment discussed but not illustrated. According to the invention, these matrices are readily constructed by well-known techniques and recorded in a novel manner to produce a digital information storage medium which approaches the low cost of punched cards and the high operating speed of magnetic cores.

Figure 3:
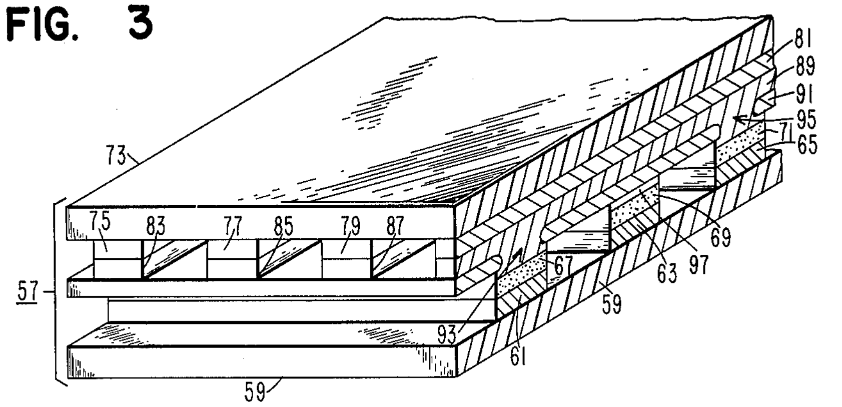
FIG. 3 is a perspective view of a laminated construction in accordance with the invention.

FIG. 3 illustrates one form of the invention having an equivalent circuit of the all-open switches form shown diagrammatically in FIG. 2. The laminated structure indicated generally by the number 57 comprises a layer of insulating material 59 upon which is disposed strips of conductive material 61, 63 and 65 in spaced apart (insulated) relation. Each of these conductive strips has a layer of rectifying material 67, 69 and 71 disposed thereupon. A second sheet of insulating material 73 has an orthogonal set of conductive lines 75, 77, 79 and 81 disposed thereupon. Each of the conductive strips 75, 77, 79 and 81 has a coating layer of solder 83, 85 and 87 and 89 disposed thereupon. Insulating sheet 59 and the strips attached thereto is separated from insulating sheet 73 and its attached strips by means of an interposed insulating sheet 91. The sheet 91 is sufficiently thick to provide adequate insulation between the upper and lower sets of conductors at low voltages, but thin enough to break down dielectrically when a relatively high voltage is applied.

It will now be recognized that the laminated construction 57 is the electrical equivalent of the matrix shown in FIG. 2. For example, the lines 25, 27, 29 and 31 of FIG. 2 correspond to lines 75, 77, 79 and 81 of FIG. 3. The lines 33, 35, 37 and 39 correspond to the lines 61, 63, 65, etc., of FIG. 3. The all-open switches 41, 45, 49 and 53 of FIG. 2 find their counterpart in the insulating layer 91 of FIG. 3 which separates the orthogonal sets of conductors to provide insulation at low operating voltages, but which will break down thus permitting the establishment of conductive connections when high recording voltages are applied. The diodes 43, 47, 51 and 55 of FIG. 2 are formed by the rectifying layers 67, 69 and 71 of the laminated structure 57.

In the structure of FIG. 3, connections have been illustrated at two points generally shown by the numbers 93 and 95. The connection 93 is formed by applying a high recording voltage to conductors 81 and 61 causing a high potential to appear across the insulating layer 91 at the intersection of these conductors. Insulating layer 91 is designed to break down at such potential and allow the solder layer 89 to melt and flow through layer 91 to establish a conductive contact through rectifying layer 67 with conductor 61. In practice, it is not always easy to establish a good soldered connection to a rectifying layer. To overcome this, the rectifying layers 67, 69, and 71 may be provided with a metalized coating such as shown at 97 prior to assembly. This permits the molten solder flowing through the holes in insulating layer 91 to establish good contact with the lower rectifying portion. However, the coating layer 97 is applied in a discontinuous pattern to prevent current flow along the metalized coating on the rectifying layer. It will be appreciated that by selectively energizing appropriate sets of orthogonal conductors, any desired information representing pattern can be established in the form of permanent connections between the orthogonal lines.

Figure 4:
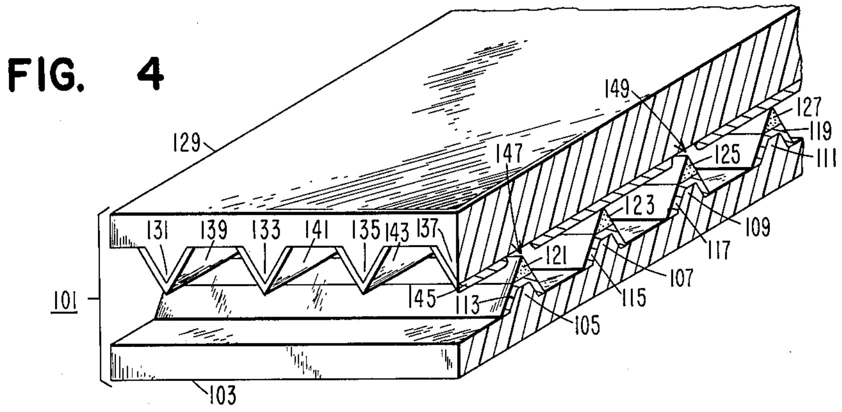
FIG. 4 is a perspective view of a second form of laminated structure.

A second form of the invention is illustrated in FIG. 4. In this form of the invention, a laminated structure 101 is composed of an insulating sheet 103 having a series of ridges 105, 107, 109 and 111 disposed thereacross. Disposed on each of these ridges is a layer of conductive material 113, 115, 117 and 119. Disposed on each of these conductive layers is a layer of rectifying material 121, 123, 125, and 127.

A second sheet of insulating material 129 also has a set of ridges 131, 133, 135 and 137 disposed in parallel fashion on the lower surface thereof. Each of these ridges has a conductive coating 139, 141, 143 and 145. The two insulating sheets 129 and 103 are pressed together in intimate physical contact so that the ridges of the top and bottom sheets form points of contact throughout the entire mating surfaces. The resultant structure is the equivalent of a matrix of the type illustrated in FIG. 2, but with all of the switches closed.

Thus, in FIG. 4 the rectifying layers 121, 123, 125 and 127 form unidirectional connections between the orthogonal sets of conductors 113, 115, 117 and 119 and conductors 139, 141, 143 and 145. Information may be recorded in this matrix by applying a high recording voltage to selected orthogonal lines. This high voltage causes a large current flow through the contact formed by the rectifying layers of the lowtr assembly and the conductive layers of the upper assembly. The result is that the junction is unable to withstand this current and a vaporization or melting away of the conductive material results. It will be seen, therefore, that the original matrix consisting of connections at all intersections may be changed into any desired pattern of connections by selectively vaporizing or melting away the undesired connections. Two such undesired connections have been melted away and are shown generally by the numbers 147 and 149. In this form of the invention it may not always be possible to establish good conductive contact between the rectifying layers 121, 123, 125 and 127 and the conductive layers 139, 141, 143, and 145. In this case it becomes necessary to provide an additional conductive layer on the upper surface of the rectifying layers similar to the discontinuous layer 97 shown in connection with the embodiment of FIG. 3.

The materials used in the construction of the two embodiments described may be any of a number of well known materials. For example, the insulating sheets may be any of the well known vinyl or ethylene polymers or their equivalents. The interposed insulating layer 91 of FIG. 3 may be a thin film of a well known insulating plastic or a special insulative composition containing a fluxing material to facilitate the solder flow during the recording operation. The conductors may be copper, cadmium, silver or any one of a number of metals adaptable to printed circuit or vapor deposition techniques. The rectifying layers may be formed from copper oxide, selenium, germanium, silicon or other equivalent semiconductive materials.

Figure 5:
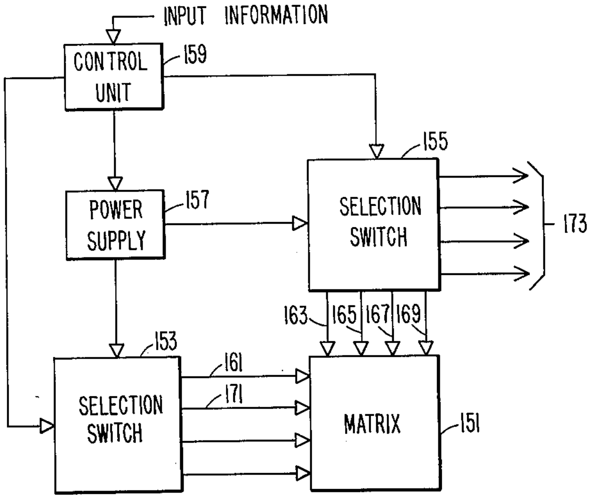
FIG. 5 is a block diagram of a system used to record information into the storage matrices of the present invention.

FIG. 5 is a block diagram of a system used to record information into the storage matrices of the present invention, and subsequently to read out the stored information. The matrix is indicated by the numeral 151. The two sets of orthogonal lines are connected to selection switches 153 and 155. Current from a power supply 157 flows through the selection switches into the matrix 151. A control unit 159 is used to control the power supply and selection switches to record into the matrix in any desired manner indicated by the input information. The control unit can be set up to record into a matrix consisting initially of all connections, or a matrix consisting initially of no-connections.

For example, should the matrix of FIG. 5 be of the type shown in FIG. 3, that is, no connections initially, then the control unit 159 would act in accordance with the input information to select first line 161 and apply a high potential from power supply 157 along line 161 into the matrix. Lines 163, 165, 167 and 169 from selection switch 155 would be selectively connected to the power supply 157 as called for by the input information acting through the control unit 159. For example, if an input at line 161 is to produce an output pattern of 1010 on lines 163, 165, 167 and 169 of the completed matrix, then the control unit would select first line 161 and energize this from power supply 157. Line 163 would be selected and simultaneously energized by power supply 157 causing a sufficiently high potential to appear across the insulating layer separating the orthogonal conductors to break down this layer and establish a soldered conductive contact between lines 161 and 163 as explained in connection with the description of FIG. 3. After this, while the line 161 remains selected, line 167 would next be selected to similarly establish a conductive contact between these lines. When this has been accomplished the next input line 171 would be selected and the process for establishing the desired pattern of contacts with lines 163, 165, 167 and 169 repeated. In this fashion any desired pattern of information can be stored in matrix 151. Alternately, the desired lines 163 and 167 may be energized in parallel rather than sequentially by use of a suitable selection switch.

As mentioned previously, the process for recording into a matrix initially having all-connections would be carried out in analogous fashion, but in this case the potentials would be applied to orthogonal lines for which no-connection was desired. This potential would break the initially present connection as explained in the description of the embodiment shown in FIG. 4.

In practice the system shown in FIG. 5 can be adapted to read out information as well as to record information. In such a system, provision would have to be made for a low voltage power supply for use in the read out operation, and the selection switch 155 would have additional output lines indicated generally by the numeral 173 for gating out the information as the input lines 161, 171 etc. were energized.

From the foregoing description it will be appreciated that this invention has provided a device for recording and storing information in the form of a pattern of connections. Since there are no moving parts and once information is recorded no further change of state takes place, the speed of operation of the matrix is more than adequate for any computer requirement. By use of printed circuit and vapor deposition techniques, the structure can be fabricated at a cost competitive with presently used punched card and tape systems. The nature of the structure renders the device highly reliable and not subject to deterioration through mishandling or other forms of abuse.

The structure described in connection with the drawings was limited to a matrix existing in a single plane. In practice it is contemplated that a number of these matrices will be assembled together in block form and encapsulated to form a permanent storage element of high density. If a plurality of matrices are stacked to form a block, it is understood that an intermediate insulating sheet may function jointly as a support for adjacent matrices. Also in the case of a block of matrices, the control system is provided with the necessary means for making three-dimensional coordinate selections for recording and reading operations. The simplicity of the structure increases the adaptability to miniaturization and hence allows an increase in storage density.

While the invention has been illustrated and described in certain arrangements, it is recognized that variations and changes may be made therein without departing from the invention as set forth in the claims.

What is claimed is:

1. An information storage device comprising a first insulating base member, a plurality of first elongated conductors disposed on said first insulating base, a layer of rectifying material disposed on each of said first elongated conductors, said rectifying material being substantially coextensive with said elongated conductors throughout the lengths thereof, a second insulating base member, and a plurality of second elongated conductors disposed on said second insulating base member, said first and second insulating base members being assembled to form a laminated matrix structure.

2. The combination according to claim 1 wherein said second conductors are disposed in intimate physical contact with the layers of rectifying material of the first conductors at their points of intersection.

3. The combination according to claim 1 wherein nonperforated insulation means are disposed between the first and second base members and their associated structures.

4. The combination according to claim 1 wherein said second conductors have a coating of solder.

5. An information storage device comprising a first insulating base member, a plurality of first elongated conductors disposed on said first insulating base member, a layer of rectifying material disposed on each of said first elongated conductors in substantially coextensive relationship throughout the length thereof, a second insulating base member, a plurality of second elongated conductors disposed on said second insulating base member, said first and second base members being assembled to form a laminated matrix structure, and insulation means disposed between said rectifying material and said second conductors, whereby selected ones of said first and second conductors may be energized with a potential sufficiently high to break down the insulation means at the crossover point of said selected conductors and establish a unidirectional contact between said first and said second set of conductors.

6. An information storage device comprising a first insulating base member, a plurality of first elongated conductors disposed on said first insulating base member, a layer of rectifying material disposed on each of said first elongated conductors in substantially coextensive relationship throughout the length thereof, a second insulating base member, and a plurality of second elongated conductors disposed on said second insulating base member, said first and second base members being assembled to form a laminated matrix structure with said rectifying material being in intimate contact with said second set of conductors at all the crossover points of said first and second sets of conductors, whereby a potential difference of sufficient magnitude may be applied to selected ones of said first and second sets of conductors to destroy undesired points of contact at said crossover points.

7. An information storage device comprising a first insulating base member, a plurality of first elongated conductors disposed on said first insulating base member, a layer of rectifying material disposed on each of said first elongated conductors in substantially coextensive relationship throughout the length thereof, a metallized coating on said rectifying material, a second insulating base member, a plurality of second elongated conductors disposed on said second insulating base member, a coating layer of solder on each of said second elongated conductors, said first and second base members being assembled to form a laminated matrix structure, and non-perforated insulation means disposed between said rectifying material and said second conductors, whereby selected ones of said first and second conductors may be energized with a potential sufficiently high to break down the insulation means at the crossover point of said selected conductors and establish a unidirectional contact between said first and said second set of conductors.

8. An information storage device comprising a first insulating base member having a first plurality of ridges, a plurality of first elongated conductors disposed on said first plurality of ridges, a layer of rectifying material disposed on each of said first elongated conductors in substantially coextensive relationship throughout the length thereof, a second insulating base member having a second plurality of ridges, and a plurality of second elongated conductors disposed on said second plurality of ridges, said first and second base members being assembled to form a laminated matrix structure with said rectifying material being in intimate contact with said second set of conductors at all the crossover points of said first and second sets of conductors, whereby a potential difference of sufficient magnitude may be applied to selected ones of said first and second sets of conductors to destroy undesired points of contact at said crossover points.

References Cited by the Examiner

UNITED STATES PATENTS

| | | | |
|---|---|---|---|
| 2,643,172 | 6/1953 | Reiss. | |
| 2,644,041 | 6/1953 | Mercer | 340—176 |
| 2,820,155 | 1/1958 | Linvill | 340—166 X |
| 2,821,691 | 1/1958 | Andre et al. | |
| 2,872,664 | 2/1959 | Minot | 340—166 |
| 2,898,483 | 8/1959 | Muller. | |
| 2,899,676 | 8/1959 | Rivers et al. | 340—166 |
| 3,017,613 | 1/1962 | Miller | 340—173 |
| 3,028,659 | 4/1962 | Wen Tsing Chow et al. | 340—166 X |
| 3,034,106 | 5/1962 | Grinich | 340—173 |
| 3,091,754 | 5/1963 | Nazare | 340—173 |
| 3,098,996 | 7/1963 | Kretzmer | 340—173 |

FOREIGN PATENTS

| | | |
|---|---|---|
| 1,082,549 | 5/1960 | Germany. |
| 734,004 | 7/1955 | Great Britain. |

OTHER REFERENCES

Publication: Proceedings of the IRE, "The Rectifier Networks for Multiposition Switching," pp. 139–147, February 1949.

IRVING L. SRAGOW, *Primary Examiner.*

STEPHEN W. CAPELLI, *Examiner.*

T. W. FEARS, *Assistant Examiner.*